US009548009B2

(12) United States Patent
Pickett et al.

(10) Patent No.: US 9,548,009 B2
(45) Date of Patent: Jan. 17, 2017

(54) ILLUMINATED SIGNAGE USING QUANTUM DOTS

(71) Applicant: Nanoco Technologies Ltd., Manchester (GB)

(72) Inventors: Nigel Pickett, Manchester (GB); Ombretta Masala, Manchester (GB); James Harris, Manchester (GB); Nathalie Gresty, Chester (GB)

(73) Assignee: Nanoco Technologies Ltd., Manchester (GB)

( * ) Notice: Subject to any disclaimer, the term of this patent is extended or adjusted under 35 U.S.C. 154(b) by 98 days.

(21) Appl. No.: 14/046,512

(22) Filed: Oct. 4, 2013

(65) Prior Publication Data

US 2014/0098515 A1 Apr. 10, 2014

Related U.S. Application Data

(60) Provisional application No. 61/709,452, filed on Oct. 4, 2012.

(51) Int. Cl.

| | |
|---|---|
| ***G01D 11/28*** | (2006.01) |
| ***G09F 13/04*** | (2006.01) |
| ***G09F 13/02*** | (2006.01) |
| ***G09F 13/18*** | (2006.01) |
| ***G09F 13/20*** | (2006.01) |
| ***G09F 13/42*** | (2006.01) |

(52) U.S. Cl.

CPC ............... *G09F 13/04* (2013.01); *G09F 13/02* (2013.01); *G09F 13/18* (2013.01); *G09F 13/20* (2013.01); *G09F 13/42* (2013.01)

(58) Field of Classification Search

CPC .......... G09F 13/04; G09F 13/18; G09F 13/20; G09F 13/42; G90F 13/02

See application file for complete search history.

(56) References Cited

U.S. PATENT DOCUMENTS

| | | | | |
|---|---|---|---|---|
| 2007/0013292 | A1* | 1/2007 | Inoue et al. | 313/504 |
| 2008/0169753 | A1 | 7/2008 | Skipor et al. | |
| 2009/0162011 | A1 | 6/2009 | Coe-Sullivan et al. | |
| 2011/0095690 | A1* | 4/2011 | Sagal | B29C 45/14 315/113 |
| 2011/0176328 | A1* | 7/2011 | Anandan | G02B 6/0036 362/606 |

(Continued)

FOREIGN PATENT DOCUMENTS

| | | | |
|---|---|---|---|
| KR | 20120002890 | A | 1/2012 |
| WO | 0166997 | A2 | 9/2001 |

(Continued)

OTHER PUBLICATIONS

International Search Report and Written Opinion received in patent application No. MPD/PM338400WO dated Jul. 10, 2014.

*Primary Examiner* — Donald Raleigh

(74) *Attorney, Agent, or Firm* — Blank Rome LLP

(57) ABSTRACT

An illuminated sign has a primary light source in spaced apart relation to a transparent or translucent substrate having quantum dot phosphors printed or coated thereon. The primary light source may be a blue LED, a white LED or an LED having a significant portion of its emission in the ultraviolet region of the spectrum. The LED may be a backlight for the transparent or translucent substrate and/or an edge light, a down light or an up light.

15 Claims, 3 Drawing Sheets

(56) References Cited

U.S. PATENT DOCUMENTS

| | | | | |
|---|---|---|---|---|
| 2011/0311453 | A1* | 12/2011 | Nie et al. | 424/9.1 |
| 2012/0200219 | A1* | 8/2012 | Song | 313/498 |
| 2012/0250351 | A1* | 10/2012 | Shin et al. | 362/608 |
| 2013/0291413 | A1* | 11/2013 | Lifka et al. | 40/542 |

FOREIGN PATENT DOCUMENTS

| | | | | |
|---|---|---|---|---|
| WO | 2005017525 | A1 | 2/2005 | |
| WO | 2011049311 | A2 | 4/2011 | |
| WO | WO 2012093344 | A1 * | 7/2012 | G09F 13/20 |

* cited by examiner

ILLUMINATED SIGNAGE USING QUANTUM DOTS

CROSS-REFERENCE TO RELATED APPLICATIONS

This application is a non-provisional of Provisional Application Ser. No. 61/709,452, filed Oct. 4, 2012, the entire contents of which are incorporated herein by reference.

BACKGROUND

1. Field of the Invention

This invention relates to illuminated signs. More particularly, it relates to signs comprising photoluminescent quantum dots (QDs).

2. Description of the Related Art Including Information Disclosed Under 37 CFR 1.97 and 1.98

Illuminated Signage

Illuminated signage has applications in a wide variety of sectors, from road safety and warning or emergency signs to advertising boards and shop fronts. Illuminated signage may be made from a range of different lighting sources, and may comprise static or rolling displays. Conventional lighting displays traditionally utilize solid-state lighting. Color is an important aspect of signage, since it may be used to convey a message by association, e.g. red often signifies danger. The human eye is also more receptive to particular wavelengths of light than others; in normal light conditions the human eye is most sensitive to light around 555 nm, i.e. yellow-green, while in low-intensity light conditions the eye becomes more receptive to violet and blue light and less sensitive to green and red light. Thus, lighting systems that can provide a wide range of colors across the visible spectrum are advantageous.

Illuminated lighting may be static, flashing, or rolling, whereby a moving message is displayed. Particular lighting systems are often more suited to one display format than another, for instance liquid crystal displays, which have long switching times, are poorly suited for flashing signage. A sign may be "back-lit" whereby the illumination comes from behind the sign, "front-lit" where illumination is typically by swan neck lights shining on the front of the sign, or "edge-lit" where an opaque sign is indirectly illuminated by backlighting to give a halo effect.

Signage Applications

In many jurisdictions, legislation is in place having requirements for illuminated traffic and safety signage. For example, "The Traffic Signs Regulations and General Directions" legislation of 1994 stipulates that, in the UK, internally or externally illuminated signage is mandatory during the times that street lighting is in use or during the hours of darkness, on any road within 50 m of a lamp lit by electricity that acts as part of a system of street lighting. Exemptions apply for temporary signage; however this must be illuminated by retro-reflective material. Estimates from a US study suggest that replacing incandescent traffic signs with LEDs could reduce energy costs by 93%; with an installation cost estimated at $300 for replacing an incandescent bulb with LEDs, the annual energy saving calculated at 1,266 kWh could save $125 in energy ["Responsible Purchasing Guide: LED Exit Signs, Street Lights, and Traffic Signals", Responsible Purchasing Network, 2009]. Failure of incandescent bulbs and fluorescent lighting can be instantaneous, which in traffic sign applications may have potentially serious consequences. Therefore, alternative signage for which the failure is gradual (e.g. dimming over time) is desirable since it offers warning, allowing time for the signage to be replaced.

The "Health and Safety" legislation of 1996 requires that, in the UK, the light emitted from illuminated signs must produce a luminous contrast that is appropriate to its environment, such that there is no excessive glare from an excessive amount of light, or poor visibility as a result of insufficient light. Specific colors must be adhered to; red for prohibition, danger, and fire-fighting equipment signs, yellow/amber for warning signs, blue for mandatory signs, and green for emergency escapes, first aid signs, and to signify no danger. As with traffic signs, failure may have potentially hazardous consequences, thus an illumination system that decays gradually rather than instantly is advantageous.

Illumination may be applied to advertising boards to attract the attention of the observer. Advertising displays benefit from a lighting system that is easily adaptable, since advertisements are often temporary, thus a permanent backlit system combined with a temporary fascia is often favorable. If the fascia is temporary, then a low-cost but quick manufacturing method is desirable, while display lifetime is less important.

Illuminated shop/business front signs may be used to attract the attention of passers-by and to make an entrance more visible during the hours of darkness. This is particularly effective for businesses that predominantly operate at night, such as bars, restaurants and nightclubs. The lighting displays may be required in any color, and are usually illuminated continuously for extended periods of time, thus a display that is inexpensive to power is desirable. Shop/business front signs are often large in size, therefore a technology without size restrictions is preferable.

Information signs, e.g. exit, toilets, "please pay here", etc. may be illuminated to enhance their visibility. Such signs are required in almost any color to suit the tastes and requirements of the consumer. The signs are likely to require continuous illumination for extended periods of time, therefore a reliable lighting system that is inexpensive to power is advantageous.

In total, illuminated signage makes considerable contribution to worldwide energy costs and $CO_2$ emissions. By using more "green" illuminated signage technologies, such as the QD signage displays described herein, not only can energy and $CO_2$ emissions be reduced, but also cost. With escalating energy costs, the initial investment cost of installation of QD signage displays can be recuperated by the energy savings, which for public funded signage could be favorable to the tax-payer. The current invention further provides a reliable illumination source, which decays gradually rather than failing instantly. The illuminated devices disclosed herein may be used to fabricate many different types of signage and are not restricted to the aforementioned applications.

Display Technologies

"Neon lighting" is often used to refer to gas discharge lighting tubes containing neon or other gases. The tubes contain a rarefied gas, across which a voltage is applied to liberate electrons from a tungsten cathode. The electrons collide, ionizing the gas inside the tube to form a plasma. Neon lighting was first exploited when it was realised that discharge from a neon-filled lamp produced vibrant red light. The term "neon lighting" has now come to encompass other gas discharge lamps, including argon, xenon, krypton, and mercury vapour. Phosphor coatings on the inside of the tube may be used to tune the emission, producing a wide array of colors. Phosphorescent materials emit at a longer wavelength than they absorb, as the absorbed radiation undergoes a Stokes shift. Examples of phosphors include $BaMg_2Al_{16}O_{27}:Eu^{2+}$ (450 nm blue emission), $Zn_2SiO_4(Mn,Sb)_2O_3$ (528 nm green emission), $Mg_4(F)(Ge,Sn)O_6:Mn$ (658 nm red emission). In conventional neon lighting, when the lamp is switched on, the cathode is heated to its thermionic emission temperature, thus liberating electrons. A variation on this principle is cold-cathode lighting, in which electrons are liberated below the thermionic emission temperature. Consequently, cold-cathode tubes typically last longer than conventional neon lights, however they are less efficient. A further advantage is that they can be instantly switched on and off. Neon lighting can last for many years, however the tubes are susceptible to absorption of the gas by the glass walls of the tube, increasing the resistance of the tube such that it cannot be illuminated by the applied voltage. Further, there are issues surrounding the safety of neon lights; tubes can be under a partial vacuum, and thus if broken can implode. Toxic mercury vapor may be released. If a cut is sustained from phosphor-coated glass, the phosphor can prevent blood clotting. Since gas discharge lamps have high energy losses as heat, their use is limited to applications that are out of human reach to minimise the risk of burns through physical contact.

The use of light-emitting diodes (LEDs) in illuminated signage is becoming increasingly popular. LEDs are used both directly as the lighting source and indirectly as backlights in conjunction with color filters. LEDs are traditionally made from inorganic semiconductors, which emit at a specific wavelength, e.g. AlGaInP (red), GaP (green), ZnSe (blue). Other forms of solid-state LED lighting include organic light-emitting diodes (OLEDs), wherein the emissive layer is a conjugated organic molecule such that delocalised $\pi$ electrons are able to conduct through the material, and polymer light emitting diodes (PLEDs), in which the organic molecule is a polymer. Advantages of SSL over traditional incandescent lighting include superior longevity, lower energy consumption resulting from less energy loss as heat, superior robustness, durability and reliability, and faster switching times. As little heat is dissipated, the bulbs are safe to touch, which is particularly advantageous for signage applications as it allows the sign to safely be cleaned and maintained during or shortly after illumination. However, SSL is expensive, and it is difficult to produce high quality white light. Several approaches to produce white light from solid-state LEDs have been explored. White light can be obtained by using three or more LEDs of differing wavelengths, e.g. with red, green and blue emission, producing high efficiency white light. However, this approach is very expensive and it is difficult to produce pure white light. Other approaches combine an LED emitting in the UV or blue region of the electromagnetic (EM) spectrum with a phosphor. One such approach is to use a combination of a UV or blue LED with a number of phosphors, e.g. a red and a green phosphor, such as $SrSi:Eu_2^+$ and $SrGaS_4:Eu_2^+$, respectively. Alternatively, a blue LED and a yellow phosphor may be combined, producing a less expensive white light source, however the color control and color rendering index of such materials is usually poor, owing to the lack of tuneability of the LED and phosphor.

Lightboxes may be used for backlighting in illuminated signage. LED or fluorescent lighting may be employed. The face panel that contains the image may be made from translucent acrylic or flex-face materials. Flex-face material allows a sign of any size to be fabricated from a single piece of material, thus avoiding the challenges involved with joining adjacent acrylic panels. Lightboxes are advantageous for temporary signage, such as advertisements, as the fascia may be readily substituted without having to change the backlighting. However, the lighting is restricted to a single color of light.

Dot matrix signs are typically used to display messages, such as announcements on public transport. The sign consists of a matrix of lights, from LEDs, liquid crystals or cathode ray tubes. The lights can be switched on or off to display text and graphics, which may also be programmed to scroll across the display. Though dot matrix signs are relatively inexpensive, reliable and easy to read, they are usually restricted to single color displays so that the display may readily be changed.

Side-emitting fibre optic cables may be used as an alternative to neon lighting for signage applications. In fibre optics, light from an LED or laser source is transmitted along a glass fibre that consists of a transparent core enclosed in a lower refractive index cladding material to result in total internal reflection. For side-emitting cables, there is a rough interface between the core and the cladding material, such that not all light is totally internally reflected and a small amount is scattered. No heat or electricity is transmitted through the optical fibres, making them safe for outdoor use in all weather conditions, which is particularly advantageous for safety signage. Neither is there a risk of sparks from a broken fibre. Typical light sources include LEDs, quartz halogen lamps and xenon metal halide lamps. Drawbacks of fibre optics include high installation costs, and for side-emitting fibres the length of cable is limited due to the loss of light along the cable.

Lenticular displays, which may be illuminated, are used to produce an image that appears to move or change as it is viewed from different angles. Lenticular displays are particularly suited to advertising signage. Disadvantages of lenticular displays include their high production cost and the display thickness, which may be large due to the lenses required.

Plasma displays exploit a similar technology to discharge and fluorescent lighting. Millions of tiny cells are encased between two glass panels. The cells contain a mixture of noble gases and mercury. When a voltage is applied across a cell, the mercury vaporises and a plasma forms. As the electrons collide with the mercury atoms, UV light is emitted, which excites the phosphor coating on the inside of the cell to produce visible or infrared (IR) radiation. Approximately 60% of radiation is typically emitted in the IR. In a plasma display, each pixel consists of three cells: one emitting red, one emitting green and one emitting blue light. Different colors are produced by varying the voltage. Advantages of plasma displays for signage applications include that they have a wider viewing angle than other forms of display, such as liquid crystal displays (LCDs). Further, they have a slim profile. However, plasma display screens are relatively expensive to produce and operate, with higher energy consumption than LCDs and LEDs. They often suffer from "screen-door effects", where the fine lines between pixels become visible. Plasma display signage is poorly suited for use at high altitudes, since the pressure differential between the air pressure and that of the gases inside the display can create a buzzing sound.

Electroluminescent (EL) displays are made from semiconducting material sandwiched between two conducting layers. The bottom layer is usually made from a reflective material, while the top layer is usually a transparent conductor, such as indium tin oxide, to transmit light. When an electric current is passed through an EL material, the atoms are excited, causing them to emit photons. The color may be modified by varying the semiconducting material. EL materials are useful for signage applications, as they are tuneable to virtually any color, providing monochromatic light with a narrow emission peak. The brightness is uniform from any viewing angle. Further, the display screens are usually thin, and have low power consumption. However, high operating voltages (>150 V) are typically required to power EL displays.

Signage may be constructed from liquid crystal displays, which require a backlight, usually from a cathode ray tube. Liquid crystals within the display change their alignment in response to an electric field; this change alters the light transmitted through the device, thus changing the image. For signage applications, liquid crystals provide a lower-energy alternative to fluorescent tubes, and are also safer to dispose of. They may be made into compact and lightweight displays in most shapes and sizes. However, disadvantages include slow response and switching times, which may be unfavorable for dynamic displays, along with a limited viewing angle.

The display technologies currently available for illuminated signage applications provide a variety of formats and colors, which may be more suitable for one particular application over another. Each technology presents its own advantages and disadvantages, however there appears to lack a system that encompasses inexpensiveness and ease of manufacture, with low operating costs, and the availability in a range of colors spanning the entire visible spectrum, in a compact package that may be made to any dimensions desired. In view of the existing technologies, there is a need for a low-power static display that may be produced quickly and inexpensively in a wide range of colors, in any size or shape, which is suitable for use in a range of situations and environments. It is also desirable that the display can be operated safely and poses limited health and safety risks both if damaged and at the end of its lifetime.

Color Tuneability

Displays using a single-colored backlight with a remote medium to tune the emission are often favorable over multiple colored illumination sources, owing to their ease of production and because the electrical circuitry requirements are minimised. LEDs are increasingly replacing incandescent and gas discharge lighting sources for backlighting, since they display superior longevity, lower energy consumption resulting from less energy loss as heat, superior robustness, durability and reliability, and faster switching times. However, with SSL it is difficult to achieve high quality white light and their intensities vary considerably with color. Thus, methods to tune the emission from SSL remotely are frequently employed. Current techniques used to achieve secondary monochromatic light from a backlit source for illuminated signage include color filters and phosphors.

Color filters comprise a white LED backlight with a range of filters to transmit blocks of monochromatic light (FIG. 1). Color filters are often favored as they are inexpensive to produce, however energy losses are high (typically 50-90%), since undesired wavelengths are absorbed by the filter. Thus, the resultant energy output is typically low. In addition, color filters require a broad-spectrum light source; white light is difficult to achieve from LEDs and consequently they are expensive.

Color tuneability may be achieved by combining an LED emitting in the UV or blue region of the electromagnetic (EM) spectrum with a phosphor; phosphorescent materials emit at a longer wavelength than they absorb, as the absorbed radiation undergoes a Stokes shift. Phosphors are traditionally fabricated from transition metal- or rare-earth-doped compounds. Examples include $SrSi{:}Eu_2^+$, $MgF_2{:}Mn$, $InBO_3{:}Eu$ and $SrGaS_4{:}Eu_2^+$, which emit in the red, orange, yellow and green, respectively. Color tuneability is limited by the range of phosphors available. The lifetime efficiencies of phosphors are limited, due to oxidation, crystal lattice degradation, and diffusion processes. Further, they are typically insoluble, making them difficult to process.

QDs, semiconductor nanoparticles of the order of 2-50 nm, can be tuned to emit at any wavelength from the UV to the near-IR region of the electromagnetic spectrum by controlling the particle size, without changing the inherent material.

II-VI chalcogenide semiconductor nanoparticles, such as ZnS, ZnSe, CdS, CdSe and CdTe, have been extensively studied. In particular, CdSe has been widely investigated due to the tuneability of its photoluminescence over the visible range of the EM spectrum. Many reproducible, scalable syntheses are described in the prior art, from a "bottom up" approach, whereby particles are synthesised atom-by-atom, from molecules, to clusters, to particles. Such approaches use "wet chemistry" techniques.

Owing to the toxicity of Cd, it is unfavorable for commercial applications; legislation restricting the use of heavy metals in commercial products is being implemented across the globe, e.g. EU directive 2002/95/EC, "Restriction of the Use of Hazardous Substances in Electronic Equipment" prohibits the sale of new electrical and electronic equipment containing lead, cadmium, mercury, and hexavalent chromium above a specified level. Consequently, attempts to synthesize heavy metal-free quantum dot semiconductors have been explored. One such candidate is the Group III-V semiconductor InP, as well as alloys of this material with other elements. Though the photoluminescence is not typically as narrow as that of Cd-based quantum dots, InP-based semiconducting nanoparticles may be synthesised on a commercial scale with full-width half-maxima (FWHM)<60 nm and photoluminescence quantum yields (PLQY)>90%, and their emission may be tuned across the visible spectrum, from the blue to the red region.

The unique properties of quantum dots arise from their dimensions. As a particle's dimensions decrease, the ratio of the surface to the interior atoms increases; the large surface area-to-volume ratio of nanoparticles results in surface properties having a strong influence on the properties of the material. Further, as the nanoparticle size decreases, the electronic wavefunction becomes confined to increasingly smaller dimensions, such that the properties of the nanoparticle become intermediate between those of the bulk material and individual atoms, a phenomenon known as "quantum confinement". The band gap becomes larger as the nanoparticle size is reduced, and the nanoparticles develop discrete energy levels, rather than a continuous energy band as observed in bulk semiconductors. Thus, nanoparticles emit at a higher energy than that of the bulk material. Due to Coulombic interactions, quantum dots have higher kinetic energy than their bulk counterparts, thus a narrow band width, and the band gap increases in energy as the particle size decreases.

QDs made from a single semiconducting material passivated by an organic layer on the surface are known as "cores". Cores tend to have a relatively low quantum efficiency, since electron-hole recombination is a facilitated by defects and dangling bonds on the surface of the nanoparticles, leading to non-radiative emission. Several approaches are used to enhance the quantum efficiency. The first approach is to synthesise a "core-shell" nanoparticle, in which a “shell” layer of a wider band gap material is grown epitaxially on the surface of the core; this serves to eliminate the surface defects and dangling bonds, thus preventing non-radiative emission. Examples of core-shell materials include CdSe/ZnS and InP/ZnS. A second approach is to grow core-multishell, “quantum dot-quantum well”, materials. In this system, a thin layer of a narrow band gap material is grown on the surface of a wide band gap core, then a final layer of the wide band gap material is grown on the surface of the narrower band gap shell. This approach ensures that all photoexcited carriers are confined to the narrower band gap layer, and examples include CdS/HgS/CdS and AlAs/GaAs/AlAs. A third technique is to grow a “graded shell” QD, where a compositionally-graded alloy shell is grown epitaxially on the core surface; this serves to eliminate defects resulting from strain. One such example is $CdSe/Cd_{1-x}Zn_xSe_{1-y}S_y$.

QD emission may be tuned to higher energies than the band gap of the bulk material by manipulating the particle size. Methods to alter the absorption and emission to lower energies than that of the bulk semiconductor involve doping wide band gap QDs with a transition metal to form “d dots”. In one example, Pradhan and Peng describe the doping of ZnSe with Mn to tune the photoluminescence from 565 nm to 610 nm [N. Pradhan et al., *J. Am. Chem. Soc.,* 2007, 129, 3339].

QD phosphors may be used to down-convert the emission from an inexpensive UV or blue solid-state lighting source. Since QDs may easily be synthesised in any color by manipulating the particle size, the emission may be tuned right across the visible range of the EM spectrum to produce any desired color of display.

In an earlier patent application (US 2010/0123155 A1, filed Nov. 19, 2009, the entire contents of which are incorporated herein by reference), we discuss the preparation of “QD-beads”, in which QDs are encapsulated into microbeads comprising an optically transparent medium; the QD-beads are then embedded in a host LED encapsulation medium. Bead diameters may range from 20 nm to 0.5 mm. QD-beads offer enhanced stability to mechanical and thermal processing relative to “bare” QDs, as well as improved stability to moisture, air, and photo-oxidation, allowing potential for processing in air, which could reduce manufacturing costs. By encapsulating the QDs into beads, they are also protected from the potentially damaging chemical environment of the encapsulation medium. Microbead encapsulation also serves to eliminate the agglomeration that is detrimental to the optical performance of bare QDs as phosphors.

Examples of QD phosphors for display technologies are described in the prior art, however most are based on II-VI and IV-VI semiconductors, such as CdSe and PbSe. Where heavy metal-free QDs are proposed, examples of device fabrication and efficiency have not been discussed.

U.S. Pat. Nos. 7,405,516 B1 and 7,833,076 B1 propose the addition of QDs to the outer shell of a plasma-display device to tune the emission from the gas discharge, however no examples of suitable QDs or methods for their incorporation are offered.

U.S. Pat. No. 7,857,485 B2 discloses an LED display device using LEDs that emit UV or blue light, then a luminescent material, for instance QDs, to tune the LED emission to the desired wavelength. No QD materials are suggested, and no examples of device fabrication using QDs are given.

Patent application US 2009/023183 A1 describes a backlight module comprising a light source and a series of wavelength converters positioned nearby to tune the emission. After passing through a wavelength converter, which may be fabricated from QD material, one portion of converted light is emitted while the remainder is directed towards another wavelength converter. No examples of suitable QD material or their use in device fabrication are disclosed.

A number of patents and patent applications propose the use of QD materials as phosphors. EP 1 758 144 A1, EP 1 775 748 A2, US 2007/0046571 A1 and US 2007/0080640 A1 all describe a plasma display panel device including a QD phosphor layer. EP 1 788 604, U.S. Pat. No. 7,667,233 B2 and US 2007/0117251 A1 disclose a flat lamp plasma display device with a phosphor layer that may be made from QDs. US 2007/0090302 A1 describes a display device including a phosphor layer that may be excited by gas discharge. The phosphor layer may be fabricated from QDs. Though each of these patents makes reference to the use of QDs as phosphors for display technologies, no examples of their use in devices or suitable QD material are provided.

Najjar et al. describe a fluorescent screen and display device with at least one excitation optical beam to excite one or more fluorescent materials on a screen, in patent application US 2006/0221021 A1. The fluorescent material may include phosphors and non-phosphors, such as QDs, though no examples of suitable QDs are specified. Device fabrication incorporating QDs is not exemplified.

The patent application US 2007/0080642 A1 by Son et al. describes a gas discharge display panel with a phosphor layer than may include QDs, but examples of suitable QDs or displays in which they are used are not provided.

Park et al. describe a gas discharge cell with two luminescent layers in patent application US 2007/0241682 A1. The first luminescent layer is composed of a phosphor, while the second may be made of a cathode luminescent or QD materials, though an appropriate QD material is not suggested. No examples of device fabrication with QDs are provided.

The patent application US 2008/019772 by Nam et al. describes a display device comprising a gas discharge tube and red, green and blue phosphors to produce white light. Traditional phosphors or alternatively QD material, which may be printable, may be used. The QD material is not specified, and neither is its printability or incorporation into a display device exemplified.

Bretchnelder et al. propose a light emitting unit, which may comprise an LED and a remote luminescent material, which could include QDs, in patent application publication WO 2011/103204 A2. Examples of suitable QDs and description of their use are not given.

The patent application US 2009/0034230 A1 describes an illumination device that may combine solid state lighting with a wavelength converting material, such as a phosphor and/or QDs, to down-convert the emission. Examples of QD materials and their use are not provided.

Patent application US 2007/0188483 A1 describes display apparatus for outdoor signage. Though it is mentioned that QD material may be used to fabricate an electronic paper-like display, no examples of appropriate QDs or their use in device fabrication are provided.

Two published international patent applications, WO 2010/123809 A2 and WO 2010.123814 A1, describe a display device comprising LEDs with an active layer of quantum wells sandwiched between two doped semiconducting layers, acting as a wavelength converter to down-convert light from the LED source. Despite proposing Group IV: Si or Ge, III-V, or II-VI QDs as appropriate materials, their utilization in display devices is not demonstrated.

The patent EP 2 270 884 A1 describes a display device with a light source and a wavelength modulator, separated by a spacer. The wavelength modulator may be made from an inorganic QD phosphor, although description of its use in the device is not included.

US 2011/0249424 A1 and EP 2 381 495 A2 describe an LED package with an LED backlight and a wavelength converting material. The wavelength converting material may be made from a phosphor and/or QDs. Suitable QDs include Group II-VI and III-VI materials, however no examples are provided for their incorporation into the LED package.

The patent application WO 2010/092362 A2 describes a device having LEDs in close contact with colloidal QDs. CdTe and core-shell CdSe/CdS are given as suitable QD materials, though examples of their use are not provided.

Patent application US 2011/0182056 A1 describes an LED device fabricated from bulk semi-polar or non-polar materials with emission tuned by phosphors, in their The phosphors may be made from QDs, including CdTe, ZnS, ZnSe, ZnTe, and CdSe, to tune the emission with a minimal effect on brightness. No examples are given to demonstrate the use of QDs in devices.

U.S. Pat. No. 8,017,972 B2 and US 2007/0246734 A1 describe a white LED device composed of a UV LED with blue and green phosphors, along with red QDs, which have better luminescence than red phosphors. The QDs are excited by the emission from the blue and green phosphor photoluminescence to alleviate the damaging effect of direct QD exposure to UV light. Group II-VI and III-V QDs are included as suitable materials, though only red CdSe QD synthesis is disclosed.

The patent applications US 2006/0157686, JP 2006/199963 A and US 2011/0121260 A1 describe QD phosphor preparation, with a formulation in which the nanoparticles do not aggregate in the resin, for use in LEDs. It is suggested that the QDs may be mixed with inorganic phosphors. Group II-VI and III-V QD materials are stated as appropriate materials, though only CdSe/CdS core-shell QD synthesis (with 85% quantum yield) is disclosed. Methods for LED preparation are also described.

U.S. Pat. No. 8,030,843 and US 2010/0066775 A1 describe a method for producing QD phosphors for use with UV LEDs. The phosphor material comprises a QD core with an organic capping material and an activator layer. ZnS and ZnO are proposed as appropriate QDs, and their synthesis is included. The synthesis is not by a colloidal method, thus a two-step process is required to synthesise then cap the particles with organic substances such as mercaptosuccinic acid and dithiosquaric acid.

The patent application US 2011/0156575 A1 includes a display device with an illumination unit comprising an LED chip and QD phosphors, and a color filter to enhance the display. It is claimed that red, green and blue QD phosphors may be used, fabricated from both Cd and Cd-free materials. Some data is included to support the use of CdSe/ZnSe QDs.

US 2008/0246017 A1 describes methods for fabricating LED chips with a layer of nanoparticles to tune the emission. It is claimed that Group II-VI, IV-VI, III-V, and I-II-VI QDs may be used. Examples highlighting the color mixing ratios to achieve specific colored emission from QDs emitting at various wavelengths are provides, however only CdSe and PbS QDs are used. No details of QD synthesis are included.

US 2008/0173886 A1 describes a method to produce solid-state lighting using QDs dispersed in acrylates, deposited over the light source to down-convert the emission. It is claimed that Group II-VI, III-V, IV-VI cores, shelled with Group II-IV, III-V, or IV-VI materials or with metals such as Cd, Zn, Hg, Pb, Al, Ga or In, may be used. Methods for QD dispersion and the curing process are described. Examples are included where red CdSe, green CdSe, red and green CdSe, and PbSe have been used in devices, however no QD synthesis is detailed.

BRIEF SUMMARY

The disclosed QD-based signage overcomes some of the processing and performance issues associated with backlit LED signage displays in the prior art. According to one embodiment, the disclosed signage uses a fully soluble quantum dot ink to form a remote phosphor layer enabling. The use of a QD phosphor layer provides color tuneability spanning the entire visible spectrum. It is demonstrated that the display devices described herein may optionally be made with heavy metal-free QD phosphorescent material, which complies with legislation on the use of heavy metals in electronic equipment.

According to one embodiment, the signage is made of an enclosure, i.e., a housing, having at least one transparent or translucent surface. The housing contains a light source configured to illuminate the transparent/translucent surface. In other words, the transparent/translucent surface is backlit using the light source, also referred to herein as a primary light source. QDs are adhered to the transparent/translucent surface in a preselected pattern. For example, the QDs may be printed onto the transparent/translucent surface in a pattern representing alphanumeric characters and/or graphics elements. According to some embodiments, the transparent/translucent surface printed with QDs is further coated with one or more protective layers, such as an oxygen barrier.

According to alternative embodiments, the primary light source is not incorporated into a housing with the QD-printed transparent/translucent surface. For example, the primary light source may be positioned at one of the edges (top, bottom, left and/or right sides, for example) of the transparent/translucent surface. Or the primary light source may be positioned in front of or behind the transparent/translucent surface. According to some embodiments, the transparent/translucent surface may itself be, or may be integrated with, a light guide that serves to collect light from the primary light source and direct it to the QD phosphors printed on the transparent/translucent surface.

The signage disclosed herein may have a variety of applications, from security signs to advertisements. Advantages of the disclosed signage include:

- QD phosphors are brighter and more efficient than color filters with a white backlight.
- Strong colors can be produced.
- The device is inexpensive to power with solid-state LEDs.
- The invention uses a readily available blue LED illumination source, which is less expensive than white LED lighting.
- The display may be tuned to any color.
- QD signage can be printed and replaced inexpensively and quickly.
- QDs are soluble. QD inks are printable by many methods, e.g. screen printing, inkjet printing and doctor blading.
- QDs do not require a specific excitation wavelength.

- Less circuitry is required and the fabrication costs are less expensive than systems using multiple colors of LEDs.
- The remote phosphor architecture provides superior longevity and performance compared with devices in which phosphors are in direct contact with the backlight.
- QD displays are safe to clean and maintain, and pose a minimal health and safety risk if damaged.
- Failure of the lighting is gradual, rather than sudden, which may be beneficial for safety signage.
- The display can be fabricated using heavy metal-free QDs to produce signage that is fully compliant with regulations that limit or ban specific substances—lead, cadmium, polybrominated biphenyl (PBB), mercury, hexavalent chromium, and polybrominated diphenyl ether (PBDE) flame retardants—in new electronic and electric equipment such as the Restriction of Hazardous Substances Directive (or RoHS) adopted by the European Union

BRIEF DESCRIPTION OF THE SEVERAL VIEWS OF THE DRAWING(S)

DETAILED DESCRIPTION

Figure 1:
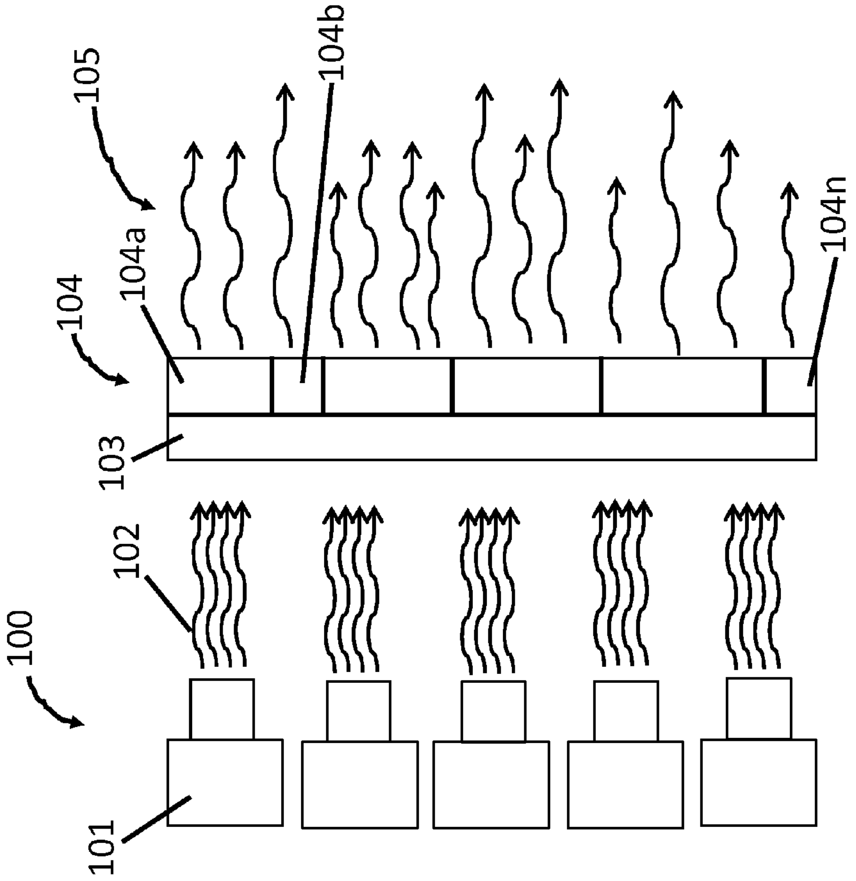
FIG. 1 is a diagram an embodiment of QD phosphor signage as disclosed herein.

FIG. 1 illustrates an embodiment 100 of QD-based illuminated signage, as disclosed herein. Signage 100 includes one or more primary light sources 101, which emits light of a first color 102. For example, primary light source(s) 101 can be a solid-state LED that emits ultraviolet or blue light 102. The primary light impinges on a diffuser 103 upon which a QD phosphor layer 104 is disposed. Alternatively, element 103 of FIG. 1 may be simply transparent or translucent substrate rather than a diffuser. According to another embodiment, element 103 may include both a transparent or translucent substrate and a diffuser. In either case, the QD phosphor layer absorbs primary light 102 and emits secondary light 105. QD phosphor layer 104 may be patterned into sections 104*a*, 104*b*, . . . 104*n*, the sections having different mixtures of QD phosphors. For example, section 104*a* of QD phosphor layer 104 may include QDs that absorb primary light 102 and emit light 105*a*. Section 104*b* of QD phosphor layer 104 may include QDs that absorb primary light 102 and emit light 105*b*. For example, 105*a* may be green light and 105*b* may be red light. Some amount of primary light 102 may also be transmitted through the diffuser and QD phosphor layers and may be blended with the emitted light from the QD phosphors.

The quantum dot phosphorescent material, illuminated with UV or blue LEDs as the primary light source, as illustrated in FIG. 1, produces brighter secondary light than that from white light with color filters. Energy losses are typically 10-20% in comparison to 50-90% using color filters. Energy losses and power consumption are also lower than other lighting systems, such as neon and fluorescent tubes, since little heat is produced.

The QD signage display system described herein is inexpensive to power in comparison to signage displays utilizing gas discharge tubes, for which there are high energy losses as heat. Multiple pure colors may be emitted using a single solid-state lighting (SSL) backlight, reducing the cost associated with installing multiple LEDs, along with the associated cost of the increased circuitry required for multiple illumination sources.

The QD phosphor layer may be illuminated with UV or blue LEDs, which are considerably less expensive than the white LEDs required for color filter-based signage. The QD phosphor down-converts the UV or blue light to a longer wavelength, tuned by the particle size, which is emitted as bright, narrow bandwidth light. Thus, strong, intense color is produced. Using Cd-based QDs, the emission may be tuned to any desired color by manipulating the particle size. Further, using heavy metal-free quantum dots (for example, CFQD™ quantum dots, available from Nanoco Group PLC, Manchester, UK), emission may be tuned across the visible spectrum from blue to red using non-toxic materials. Producing a range of colors is much more facile than for solid-state LEDs, which require either a range of different colored solid-state LEDs or different phosphors. In addition, QDs require less specific excitation wavelengths relative to many other phosphors. Since the entire visible spectrum of colors may be emitted by QD material, all of the color requirements of the UK "Health and Safety" legislation of 1996 are achievable.

The QD phosphor layer may be printed onto the substrate using ink containing the QD materials. The QD materials disclosed herein are soluble in a range of organic solvents and the resulting inks are printable by many methods, including screen printing, inkjet printing and doctor blading. The ease of processability enables signs to be produced and replaced inexpensively and quickly. This is particularly advantageous for emergency signage, such as fire exits, where the signs must be easily replaced if they encounter damage.

QD-containing inks are described in co-owned patent application publication no. 2013/0075692, filed Sep. 21, 2012, the entire contents of which are incorporated herein by reference. Particularly suitable ink formulations include QDs or QD-containing beads, disbursed in a polystyrene/toluene mixture. Other suitable ink matrices include acrylates.

Using remote phosphor architecture, rather than a system where the phosphor is in physical contact with the backlight, provides enhanced longevity. Thermal quenching of the phosphor is reduced as it is less exposed to heat emitted from the primary light source. This assists in maintenance of the color frequency and intensity throughout the lifetime of the device.

Some of the disadvantages of the illuminated display technologies currently in use for signage applications revolve around their safety. Safety is a key consideration throughout the lifetime of a sign. It is necessary that a sign may be maintained safely, and that potential damage or failure of system does not pose a significant risk. This is particularly important for signage in public places, which could potentially harm passers-by. The QD phosphor signage aims to minimise many of the existing safety concerns associated with existing display technologies. Since the QD phosphor signage utilizes solid-state LED backlights, little heat is generated. Thus, the signage may be touched while in operation without the risk of being burnt. This is particularly advantageous for low level signage in public places. The QD phosphor layer does not emit appreciable heat. The lighting arrangement does not involve elevated pressures or vacuum, therefore there is no risk of explosion or implosion if the device is damaged.

The signage disclosed herein will gradually fail over time. Failure may either be from the LED backlights, or from decay of the photoluminescence of the QD phosphor. Both will result in gradual dimming of the signage display, while the latter may also result in a progressive shift in the emission wavelength as a higher proportion of the LED backlighting is transmitted. These gradual changes in performance are more favourable for signage applications than the instant failures associated with discharge lighting. A gradual change provides warning that the signage may be coming to the end of its lifespan and allows time for replacement, whereas an instant illumination failure may give no warning and may have potentially dangerous consequences, for instance if being used for safety signs.

The QDs used herein are optimally made from core-shell semiconductor nanoparticles.

The core material may be made from:

Group II-VI compounds including a first element from group 12 (II) of the periodic table and a second element from group 16 (VI) of the periodic table, as well as ternary and quaternary materials including, but not restricted to: CdSe, CdTe, ZnS, ZnSe, ZnTe, ZnO, HgS, HgSe, HgTe, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, CdZnSeS, CdZnSeTe, CdHgSeS, CdHgSeTe, CdHgSTe, HgZnSeS, HgZnSeTe.

Group II-V compounds incorporating a first element from group 12 of the periodic table and a second element from group 15 of the periodic table, and also including ternary and quaternary materials and doped materials. Nanoparticle material includes, but is not restricted to: $Zn_3P_2$, $Zn_3As_2$, $Cd_3P_2$, $Cd_3As_2$, $Cd_3N_2$, $Zn_3N_2$.

Group III-V compounds including a first element from group 13 (III) of the periodic table and a second element from group 15 (V) of the periodic table, as well as ternary and quaternary materials. Examples of nanoparticle core materials include, but are not restricted to: BP, AlP, AlAs, AlSb, GaN, GaP, GaAs, GaSb; InN, InP, InAs, InSb, AlN, BN, GaNP, GaNAs, InNP, InNAs, GAInPAs, GaAlPAs, GaAlPSb, GaInNSb, InAlNSb, InAlPAs, InAlPSb.

Group III-VI compounds including a first element from group 13 of the periodic table and a second element from group 16 of the periodic table and also including ternary and quaternary materials. Nanoparticle material includes, but is not restricted to: $Al_2S_3$, $Al_2Se_3$, $Al_2Te_3$, $Ga_2S_3$, $Ga_2Se_3$, $In_2S_3$, $In_2Se_3$, $Ga_2Te_3$, $In_2Te_3$.

Group IV elements or compounds including elements from group 14 (IV): Si, Ge, SiC, SiGe.

Group IV-VI compounds including a first element from group 14 (IV) of the periodic table and a second element from group 16 (VI) of the periodic table, as well as ternary and quaternary materials including, but not restricted to: PbS, PbSe, PbTe, SnSeS, SnSeTe, SnSTe, PbSeS, PbSeTe, PbSTe, SnPbSe, SnPbTe, SnPbSeTe, SnPbSTe.

The shell layer(s) grown on the nanoparticle core may include any one or more of the following materials:

Group IIA-VIB (2-16) material, incorporating a first element from group 2 of the periodic table and a second element from group 16 of the periodic table, and also including ternary and quaternary materials and doped materials. Nanoparticle material includes, but is not restricted to: MgS, MgSe, MgTe, CaS, CaSe, CaTe, SrS, SrSe, SrTe.

Group IIB-VIB (12-16) material incorporating a first element from group 12 of the periodic table and a second element from group 16 of the periodic table, and also including ternary and quaternary materials and doped materials. Nanoparticle material includes, but is not restricted to: ZnS, ZnSe, ZnTe, CdS, CdSe, CdTe, HgS, HgSe, HgTe.

Group II-V material incorporating a first element from group 12 of the periodic table and a second element from group 15 of the periodic table, and also including ternary and quaternary materials and doped materials. Nanoparticle material includes, but is not restricted to: $Zn_3P_2$, $Zn_3As_2$, $Cd_3P_2$, $Cd_3As_2$, $Cd_3N_2$, $Zn_3N_2$.

Group III-V material incorporating a first element from group 13 of the periodic table and a second element from group 15 of the periodic table, and also including ternary and quaternary materials and doped materials. Nanoparticle material includes, but is not restricted to: BP, AlP, AlAs, AlSb, GaN, GaP, GaAs, GaSb; InN, InP, InAs, InSb, AlN, BN.

Group III-IV material incorporating a first element from group 13 of the periodic table and a second element from group 14 of the periodic table, and also including ternary and quaternary materials and doped materials. Nanoparticle material includes, but is not restricted to: $B_4C$, $Al_4C_3$, $Ga_4C$.

Group III-VI material incorporating a first element from group 13 of the periodic table and a second element from group 16 of the periodic table, and also including ternary and quaternary materials. Nanoparticle material includes, but is not restricted to: $Al_2S_3$, $Al_2Se_3$, $Al_2Te_3$, $Ga_2S_3$, $Ga_2Se_3$, $In_2S_3$, $In_2Se_3$, $Ga_2Te_3$, $In_2Te_3$.

Group IV-VI material incorporating a first element from group 14 of the periodic table and a second element from group 16 of the periodic table, and also including ternary and quaternary materials and doped materials. Nanoparticle material includes, but is not restricted to: PbS, PbSe, PbTe, $Sb_2Te_3$, SnS, SnSe, SnTe.

Nanoparticle material incorporating a first element from any group in the d-block of the periodic table, and a second element from any group 16 of the periodic table, and also including ternary and quaternary materials and doped materials. Nanoparticle material includes, but is not restricted to: NiS, CrS, $CuInS_2$, $CuInSe_2$, $CuGaS_2$, $CuGaSe_2$.

In one particular embodiment, the QDs are made of a heavy metal-free semiconductor material. For example, the cores may comprise InP or may comprise an alloy comprising indium and phosphorous and further comprising one or more other elements, such as zinc, selenium, or sulphur. The cores may be shelled with one or more layers comprised of heavy metal-free semiconductor material such as, but not restricted to, Group II-VI materials, e.g. ZnO, ZnSe, ZnS, Group III-V materials, e.g., GaP, and/or their ternary and quaternary alloys. This method utilizes QDs that are capable of emitting across the entire visible spectrum, while being fully compliant with regulations prohibiting the use of heavy metals in electronic and electrical products.

The coordination around the atoms on the surface of any core, core-shell or core-multishell, doped or graded nanoparticle is incomplete and the non-fully coordinated atoms have dangling bonds which make them highly reactive and may lead to particle agglomeration. This problem is overcome by passivating (capping) the "bare" surface atoms with protecting organic groups.

The outermost layer (capping agent) of organic material or sheath material helps to inhibit particle-particle aggregation, further protecting the nanoparticles from their surrounding electronic and chemical environments. The capping agent may be selected to provide solubility in an appropriate solvent, chosen for its printability properties (viscosity, volatility, etc.). In many cases, the capping agent is the solvent in which the nanoparticle preparation is undertaken, and consists of a Lewis base compound, or a Lewis base compound diluted in an inert solvent such as a hydrocarbon. There is a lone pair of electrons on the Lewis base capping agent that is capable of a donor-type coordination to the surface of the nanoparticle and include mono- or multi-dentate ligands such as phosphines (trioctylphosphine, triphenylphosphine, t-butylphosphine, etc.), phosphine oxides (trioctylphosphine oxide, triphenylphosphine oxide, etc.), alkyl phosphonic acids, alkyl-amines (octadecylamine, hexadecylamine, octylamine, etc.), arylamines, pyridines, long chain fatty acids (myristic acid, oleic acid, undecylenic acid, etc.) and thiophenes but is, as one skilled in the art will know, not restricted to these materials.

The outermost layer (capping agent) of a QD may also consist of a coordinated ligand with additional functional groups that may be used as chemical linkage to other inorganic, organic or biological material, whereby the functional group is pointing away from the QD surface and is available to bond/react/interact with other available molecules, such as amines, alcohols, carboxylic acids, esters, acid chloride, anhydrides, ethers, alkyl halides, amides, alkenes, alkanes, alkynes, allenes, amino acids, azide groups, etc. but is, as one skilled in the art will know, not limited to these functionalised molecules. The outermost layer (capping agent) of a QD may also consist of a coordinated ligand with a functional group that is polymerizable and may be used to form a polymer layer around the particle.

The outermost layer (capping agent) may also consist of organic units that are directly bonded to the outermost inorganic layer such as via an S—S bond between the inorganic surface (ZnS) and a thiol capping molecule. These may also possess additional functional group(s), not bonded to the surface of the particle, which may be used to form a polymer around the particle, or for further reaction/interaction/chemical linkage.

Referring again to FIG. 1, QD phosphor layer 104 may be fabricated with "bare" QDs dispersed directly into an ink formulation. Alternatively, the QDs may be incorporated into microbeads prior to their dispersion into the ink formulation. QD microbeads can exhibit superior robustness and longer lifetimes than bare QDs, and can be more stable to the mechanical and thermal processing protocols of device fabrication. By incorporating the QD material into polymer microbeads, the nanoparticles become more resistant to air, moisture and photo-oxidation, opening up the possibility for processing in air that would vastly reduce the manufacturing cost. The bead size may be tuned from 20 nm to 0.5 mm, enabling control over the ink viscosity without changing the inherent optical properties of the QDs. The viscosity dictates how the QD bead ink flows through a mesh, dries, and adheres to a substrate, so thinners are not required to alter the viscosity, reducing the cost of the ink formulation. By incorporating the QDs into microbeads, the detrimental effect of particle agglomeration on the optical performance of bare encapsulated QDs is eliminated.

Figures 2, 2A, 2B:
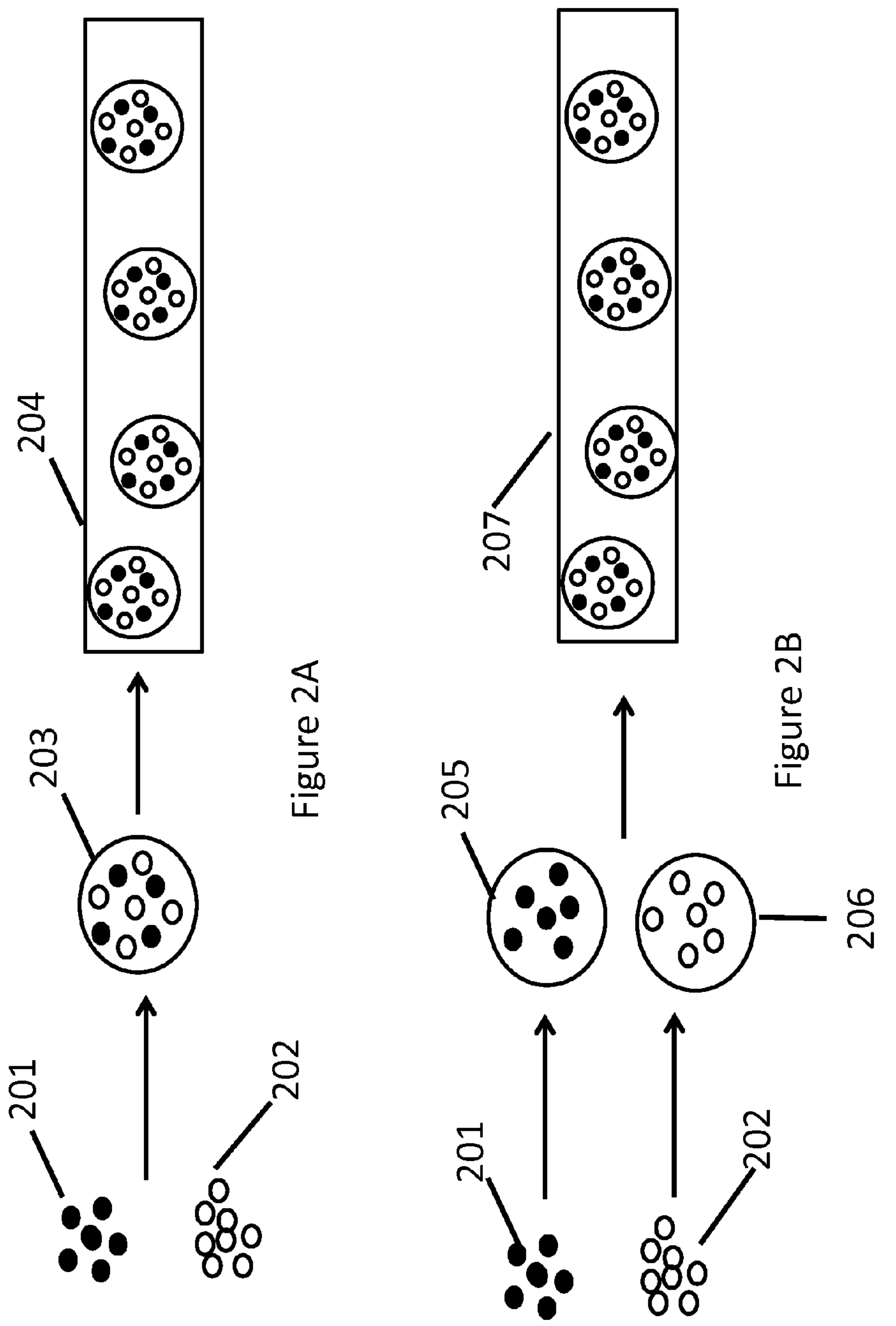
FIG. 2 is a diagram showing methods of color mixing of red and green QDs using QD beads, either incorporating red and green QDs into the same bead (FIG. 2A) or preparing separate red and green QD beads, which may be printed on the same QD phosphor sheet (FIG. 2B).

Moreover, QD beads provide an effective method of color mixing, as illustrated in FIG. 2. FIG. 2A illustrates an embodiment wherein different colored QDs, for example, green-emitting QDs 201 and red-emitting QDs 202 are incorporated into bead 203. Beads 203 incorporating the two colors of QDs are then incorporated into QD phosphor layer 204. Alternatively, several QD beads, each containing a different single color of QDs, may be incorporated into the phosphor layer. For example, FIG. 2B illustrates an embodiment wherein beads 205 incorporate green-emitting QDs 201 and beads 206 incorporate red-emitting QDs 202. Both beads 205 and 206 can be incorporated into QD phosphor layer 207. It will be appreciated that any color-emitting QDs can be used and combinations of the approaches illustrated in FIGS. 2A and 2B can be used.

Incorporation of QDs into beads is described in co-owned patent application publication no. 2010/0123155, referenced above. Briefly, one such method for incorporating QDs into microbeads involves growing the polymer bead around the QDs. A second method incorporates QDs into pre-existing microbeads.

With regard to the first option, by way of example, hexadecylamine-capped CdSe-based semiconductor nanoparticles may be treated with at least one, more preferably two or more polymerizable ligands (optionally one ligand in excess) resulting in the displacement of at least some of the hexadecylamine capping layer with the polymerizable ligand(s). The displacement of the capping layer with the polymerizable ligand(s) may be accomplished by selecting a polymerizable ligand or ligands with structures similar to that of trioctylphosphine oxide (TOPO), which is a ligand with a known and very high affinity for CdSe-based nanoparticles. It will be appreciated that this basic methodology may be applied to other nanoparticle/ligand pairs to achieve a similar effect. That is, for any particular type of nanoparticle (material and/or size), it is possible to select one or more appropriate polymerizable surface binding ligands by choosing polymerizable ligands comprising a structural motif which is analogous in some way (e.g. has a similar physical and/or chemical structure) to the structure of a known surface binding ligand. Once the nanoparticles have been surface-modified in this way, they may then be added to a monomer component of a number of microscale polymerization reactions to form a variety of QD-containing resins and beads. Another option is the polymerization of one or more polymerizable monomers from which the optically transparent medium is to be formed in the presence of at least a portion of the semiconductor nanoparticles to be incorporated into the optically transparent medium. The resulting materials incorporate the QDs covalently and appear highly colored even after prolonged periods of Soxhlet extraction.

Examples of polymerization methods that may be used to construct QD-containing beads include, but are not restricted to, suspension, dispersion, emulsion, living, anionic, cationic, RAFT, ATRP, bulk, ring-closing metathesis and ring-opening metathesis. Initiation of the polymerization reaction may be induced by any suitable method that causes the monomers to react with one another, such as by the use of free radicals, light, ultrasound, cations, anions, or heat. A preferred method is suspension polymerization, involving thermal curing of one or more polymerizable monomers from which the optically transparent medium is to be formed. Said polymerizable monomers preferably comprise methyl (meth)acrylate, ethylene glycol dimethacrylate and vinyl acetate. This combination of monomers has been shown to exhibit excellent compatibility with existing commercially available LED encapsulants and has been used to fabricate a light emitting device exhibiting significantly improved performance compared to a device prepared using essentially prior art methodology. Other preferred polymerizable monomers are epoxy or polyepoxide monomers, which may be polymerized using any appropriate mechanism, such as curing with ultraviolet irradiation.

QD-containing microbeads may be produced by dispersing a known population of QDs within a polymer matrix, curing the polymer and then grinding the resulting cured material. This is particularly suitable for use with polymers that become relatively hard and brittle after curing, such as many common epoxy or polyepoxide polymers (e.g. Optocast™ 3553 from Electronic Materials, Inc., USA).

QD-containing beads may be generated simply by adding QDs to the mixture of reagents used to construct the beads. In some instances, nascent QDs will be used as isolated from the reaction employed for their synthesis, and are thus generally coated with an inert outer organic ligand layer. In an alternative procedure, a ligand exchange process may be carried out prior to the bead-forming reaction. Here, one or more chemically reactive ligands (for example a ligand for the QDs that also contains a polymerizable moiety) are added in excess to a solution of nascent QDs coated in an inert outer organic layer. After an appropriate incubation time the QDs are isolated, for example by precipitation and subsequent centrifugation, washed and then incorporated into the mixture of reagents used in the bead forming reaction/process.

Both QD incorporation strategies will result in statistically random incorporation of the QDs into the beads and thus the polymerization reaction will result in beads containing statistically similar amounts of the QDs. It will be obvious to one skilled in the art that bead size may be controlled by the choice of polymerization reaction used to construct the beads, and additionally once a polymerization method has been selected bead size may also be controlled by selecting appropriate reaction conditions, e.g. by stirring the reaction mixture more quickly in a suspension polymerization reaction to generate smaller beads. Moreover, the shape of the beads may be readily controlled by choice of procedure in conjunction with whether or not the reaction is carried out in a mould. The composition of the beads may be altered by changing the composition of the monomer mixture from which the beads are constructed. Similarly, the beads may also be cross-linked with varying amounts of one or more cross-linking agents (e.g. divinyl benzene). If beads are constructed with a high degree of cross-linking, e.g. greater than 5 mol. % cross-linker, it may be desirable to incorporate a porogen (e.g. toluene or cyclohexane) during the bead-forming reaction. The use of a porogen in such a way leaves permanent pores within the matrix constituting each bead. These pores may be sufficiently large to allow the ingress of QDs into the bead.

QDs may also be incorporated in beads using reverse emulsion-based techniques. The QDs may be mixed with precursor(s) to the optically transparent coating material and then introduced into a stable reverse emulsion containing, for example, an organic solvent and a suitable salt. Following agitation the precursors form microbeads encompassing the QDs, which may then be collected using any appropriate method, such as centrifugation. If desired, one or more additional surface layers or shells of the same or a different optically transparent material may be added prior to isolation of the QD-containing beads by addition of further quantities of the requisite shell layer precursor material(s).

In respect of the second option for incorporating QDs into beads, the QDs may be immobilized in polymer beads through physical entrapment. For example, a solution of QDs in a suitable solvent (e.g. an organic solvent) may be incubated with a sample of polymer beads. Removal of the solvent using any appropriate method results in the QDs becoming immobilized within the matrix of the polymer beads. The QDs remain immobilized in the beads unless the sample is resuspended in a solvent (e.g. organic solvent) in which the QDs are freely soluble. Optionally, at this stage the outside of the beads may be sealed. Alternatively, at least a portion of the QDs may be physically attached to prefabricated polymer beads. Said attachment may be achieved by immobilization of the portion of the semiconductor nanoparticles within the polymer matrix of the prefabricated polymeric beads or by chemical, covalent, ionic, or physical connection between the portion of semiconductor nanoparticles and the prefabricated polymeric beads. Examples of prefabricated polymeric beads comprise polystyrene, polydivinyl benzene and a polythiol.

QDs may be irreversibly incorporated into prefabricated beads in a number of ways, e.g. chemical, covalent, ionic, physical (e.g. by entrapment) or any other form of interaction. If prefabricated beads are to be used for the incorporation of QDs, the solvent accessible surfaces of the bead may be chemically inert (e.g. polystyrene) or alternatively they may be chemically reactive/functionalised (e.g. Merrifield's Resin). The chemical functionality may be introduced during the construction of the bead, for example by the incorporation of a chemically functionalised monomer, or alternatively chemical functionality may be introduced in a post-bead construction treatment, for example by conducting a chloromethylation reaction. Additionally, a post-bead construction polymeric graft or other similar process, whereby chemically reactive polymer(s) are attached to the outer layers/accessible surfaces of the bead, may be used to introduce chemical functionality. More than one such post-construction derivation process may be carried out to introduce chemical functionality onto/into the bead.

As with QD incorporation into beads during the bead forming reaction, i.e. the first option described above, the pre-fabricated beads may be of any shape, size and composition, may have any degree of cross-linker, and may contain permanent pores if constructed in the presence of a porogen. QDs may be imbibed into the beads by incubating a solution of QDs in an organic solvent and adding this solvent to the beads. The solvent must be capable of wetting the beads and, in the case of lightly cross-linked beads, preferably 0-10% cross-linked and most preferably 0-2% cross-linked, the solvent should cause the polymer matrix to swell in addition to solvating the QDs. Once the QD-containing solvent has been incubated with the beads, it is removed, for example by heating the mixture and causing the solvent to evaporate, and the QDs become embedded in the polymer matrix constituting the bead or alternatively by the addition of a second solvent in which the QDs are not readily soluble but which mixes with the first solvent causing the QDs to precipitate within the polymer matrix constituting the beads. Immobilization may be reversible if the bead is not chemically reactive, or else if the bead is chemically reactive the QDs may be held permanently within the polymer matrix by chemical, covalent, ionic, or any other form of interaction.

Optically transparent media that are sol-gels and glasses, intended to incorporate QDs, may be formed in an analogous fashion to the method used to incorporate QDs into beads during the bead-forming process as described above. For example, a single type of QD (e.g. one color) may be added to the reaction mixture used to produce the sol-gel or glass. Alternatively, two or more types of QD (e.g. two or more colors) may be added to the reaction mixture used to produce the sol-gel or glass. The sol-gels and glasses produced by these procedures may have any shape, morphology or 3-dimensional structure. For example, the particles may be spherical, disc-like, rod-like, ovoid, cubic, rectangular, or any of many other possible configurations.

By incorporating QDs into beads in the presence of materials that act as stability-enhancing additives and optionally providing the beads with a protective surface coating, migration of deleterious species, such as moisture, oxygen and/or free radicals, is reduced if not entirely eliminated, with the result of enhancing the physical, chemical and/or photo-stability of the semiconductor nanoparticles.

An additive may be combined with "bare" semiconductor nanoparticles and precursors at the initial stages of the production process of the beads. Alternatively or additionally, an additive may be added after the semiconductor nanoparticles have been entrapped within the beads.

The additives that may be added singly or in any desirable combination during the bead formation process can be grouped according to their intended function, as follows:

Mechanical sealing: fumed silica (e.g. Cab-O-Sil™), ZnO, $TiO_2$, ZrO, Mg stearate, Zn Stearate, all used as a filler to provide mechanical sealing and/or reduce porosity.

Capping agents: tetradecyl phosphonic acid (TDPA), oleic acid, stearic acid, polyunsaturated fatty acids, sorbic acid, Zn methacrylate, Mg stearate, Zn stearate, isopropyl myristate. Some of these have multiple functionalities and may act as capping agents, free-radical scavengers and/or reducing agents.

Reducing agents: ascorbic acid palmitate, alpha tocopherol (vitamin E), octane thiol, butylated hydroxyanisole (BHA), butylated hydroxytoluene (BHT), gallate esters (propyl, lauryl, octyl, etc.), a metabisulfite (e.g. the sodium or potassium salt).

Free radical scavengers: benzophenones.

Hydride reactive agents: 1,4-butandiol, 2-hydroxyethyl methacrylate, allyl methacrylate, 1,6-heptadiene-4-ol, 1,7-octadiene, and 1,4-butadiene.

The selection of the additive(s) for a particular application will depend upon the nature of the semiconductor nanoparticle material (e.g. how sensitive the nanoparticle material is to physical, chemical and/or photo-induced degradation), the nature of the primary matrix material (e.g. how porous it is to potentially deleterious species, such as free-radicals, oxygen, moisture, etc.), the intended function of the final material or device which will contain the primary particles (e.g. the operating conditions of the material or device), and the process conditions required to fabricate the said final material or device. As such, one or more appropriate additives may be selected from the above five lists to suit any desirable semiconductor nanoparticle application.

The QDs, either after incorporated into the beads or after printing a "bare" QD ink, may be further coated with a suitable material to provide each bead with a protective barrier to prevent the passage or diffusion of potentially deleterious species, e.g. oxygen, moisture or free radicals from the external environment, through the bead material to the semiconductor nanoparticles. As a result, the semiconductor nanoparticles are less sensitive to their surrounding environment and the various processing conditions typically required to utilize the nanoparticles in applications such as the fabrication of QD phosphors or QD-ink-printed light guides.

The coating is preferably a barrier to the passage of oxygen or any type of oxidizing agent through the bead material. The coating may be a barrier to the passage of free radical species and/or is preferably a moisture barrier so that moisture in the environment surrounding the beads cannot contact the semiconductor nanoparticles incorporated within the beads.

The coating may provide a layer of material on a surface of the bead of any desirable thickness, provided it affords the required level of protection. The surface layer coating may be around 1 to 10 nm thick, up to around 400 to 500 nm thick, or more. Preferred layer thicknesses are in the range of 1 nm to 200 nm, more preferably around 5 nm to 100 nm.

The coating may comprise an inorganic material, such as a dielectric (insulator), a metal oxide, a metal nitride or a silica-based material (e.g. a glass).

The metal oxide may be a single metal oxide (i.e. oxide ions combined with a single type of metal ion, e.g. $Al_2O_3$), or may be a mixed metal oxide (i.e. oxide ions combined with two or more types of metal ion, e.g. $SrTiO_3$). The metal ion(s) of the (mixed) metal oxide may be selected from any suitable group of the periodic table, such as group 2, 13, 14 or 15, or may be a transition metal, d-block metal, or lanthanide metal.

Preferred metal oxides are selected from the group consisting of $Al_2O_3$, $B_2O_3$, $Co_2O_3$, $Cr_2O_3$, CuO, $Fe_2O_3$, $Ga_2O_3$, $HfO_2$, $In_2O_3$, MgO, $Nb_2O_5$, NiO, $SiO_2$, $Sn0_2$, $Ta_2O_5$, $TiO_2$, $ZrO_2$, $Sc_2O_3$, $Y_2O_3$, $GeO_2$, $La_2O_3$, $CeO_2$, $PrO_x$ (x=appropriate integer), $Nd_2O_3$, $Sm_2O_3$, $EuO_y$ (y=appropriate integer), $Gd_2O_3$, $Dy_2O_3$, $Ho_2O_3$, $Er_2O_3$, $Tm_2O_3$, $Yb_2O_3$, $Lu_2O_3$, $SrTiO_3$, $BaTiO_3$, $PbTiO_3$, $PbZrO_3$, $Bi_mTi_nO$ (m, n=appropriate integer), $Bi_aSi_bO$ (a, b=appropriate integer), $SrTa_2O_6$, $SrBi_2Ta_2O_9$, $YScO_3$, $LaAlO_3$, $NdAlO_3$, $GdScO_3$, $LaScO_3$, $LaLuO_3$, $Er_3Ga_5O_{13}$.

Preferred metal nitrides may be selected from the group consisting of BN, AlN, GaN, InN, $Zr_3N_4$, $Cu_2N$, $Hf_3N_4$, $SiN_c$ (c=appropriate integer), TiN, $Ta_3N_5$, TiSiN, TiAlN, TaN, NbN, MoN, $WN_d$ (d=appropriate integer), $WN_eC_f$ (e, f=appropriate integer).

The inorganic coating may comprise silica in any appropriate crystalline form.

The coating may incorporate an inorganic material in combination with an organic or polymeric material, e.g. an inorganic/polymer hybrid, such as a silica-acrylate hybrid material.

The coating may comprise a polymeric material, which may be a saturated or unsaturated hydrocarbon polymer, or may incorporate one or more heteroatoms (e.g. O, S, N, halogen) or heteroatom-containing functional groups (e.g. carbonyl, cyano, ether, epoxide, amide, etc.).

Examples of preferred polymeric coating materials include acrylate polymers (e.g. polymethyl(meth)acrylate, polybutylmethacrylate, polyoctylmethacrylate, alkylcyanoacryaltes, polyethyleneglycol dimethacrylate, polyvinylacetate, etc.), epoxides (e.g. EPOTEK 301 A and B thermal curing epoxy, EPOTEK OG112-4 single-pot UV curing epoxy, or EX0135 A and B thermal curing epoxy), polyamides, polyimides, polyesters, polycarbonates, polythioethers, polyacrylonitryls, polydienes, polystyrene polybutadiene copolymers (Kratons), pyrelenes, poly-para-xylylene (parylenes), polyetheretherketone (PEEK), polyvinylidene fluoride (PVDF), polydivinyl benzene, polyethylene, polypropylene, polyethylene terephthalate (PET), polyisobutylene (butyl rubber), polyisoprene, and cellulose derivatives (methyl cellulose, ethyl cellulose, hydroxypropylmethyl cellulose, hydroxypropylmethylcellulose phthalate, nitrocellulose), and combinations thereof.

Moreover, the coatings described above may be applied as a layer on top of the QD phosphor ink layer printed on the transparent/translucent substrate.

Illuminated signage incorporating the use of QDs is demonstrated in the following examples. The examples included herein are intended for the purpose of illustration and the invention is not restricted to these.

EXAMPLE 1

Figure 3:
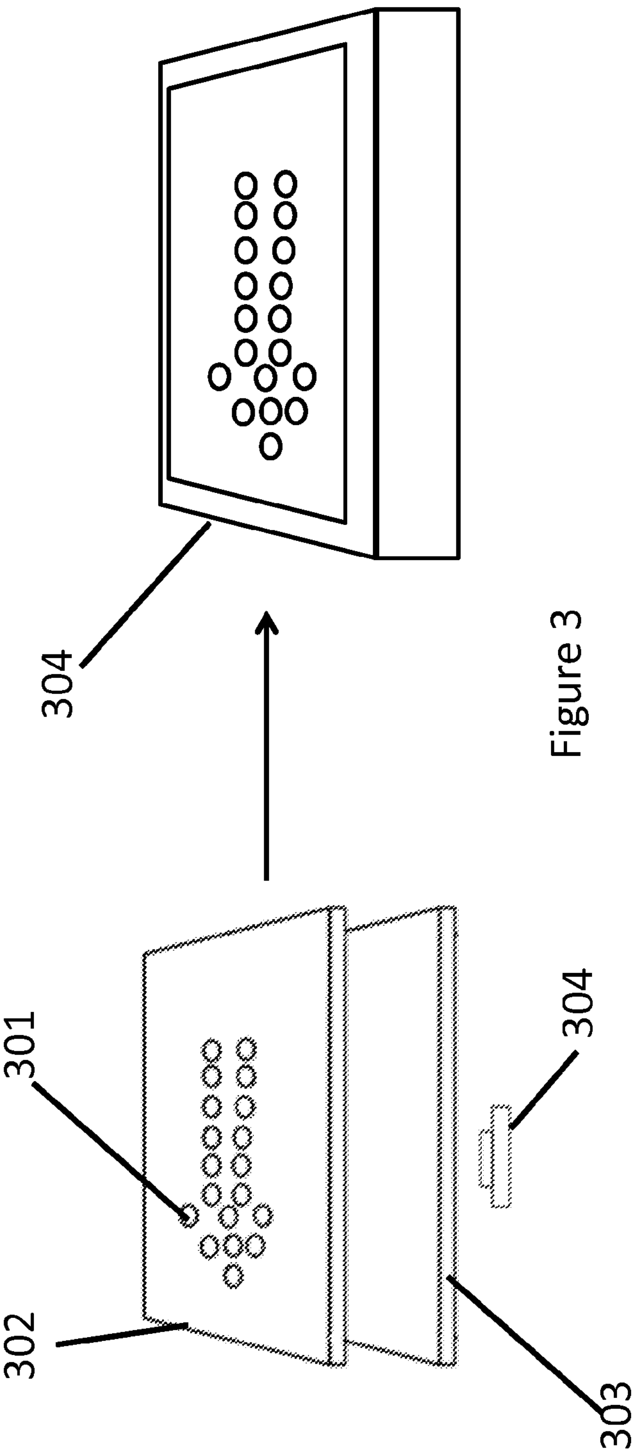
FIG. 3 shows bottom-lit QD signage using UV solid-state LEDs with a diffuser and a QD phosphor encased in a suitable housing unit.

One embodiment of signage is illustrated in FIG. 3. This illuminated signage is fabricated using a remote phosphor architecture. One or more QD inks 301 are used to form a pattern on a substrate. The QD ink(s) is printed onto, and/or encapsulated in, an appropriate medium such as a glass substrate 302. The QD-printed substrate 302, along with a diffuser plate 303 and a primary back-lighting source 304 are encased in a suitable housing unit 306. The primary back-lighting source can be one or more UV or blue solid-state LEDs, for example. The encapsulated QD resin is illuminated from, which excites the QDs in the resin(s). The patterned QD resin down-converts the primary LED emission to a longer wavelength, determined by the nanoparticle size. The down-converted light, possibly mixed with primary light, is emitted from the signage.

EXAMPLE 2

In another embodiment a light guide of printed QD phosphor material is illuminated remotely by a light source that is independent from the sign. This architecture is particularly applicable to signage that does not need to be permanently illuminated.

The QD ink may be printed directly onto a transparent/translucent substrate (glass, Perspex, etc. but not restricted to these). Optionally, the dried ink may be coated with an oxygen barrier such as, but not restricted to, butyl rubber, to improve the lifetime of the QD phosphor. The substrate itself may be a light guide or the substrate may be integrated with a light guide, which gathers light from the primary light source and guides it to the printed QD phosphor. The light guide may be illuminated by UV or blue solid state LEDs from any direction: e.g. from in front, behind, above, below, or from either or both sides.

Although particular embodiments of the present invention have been shown and described, they are not intended to limit what this patent covers. One skilled in the art will understand that various changes and modifications may be made without departing from the scope of the present invention as literally and equivalently covered by the following claims.

What is claimed is:

1. An illuminated sign comprising:

an enclosure having at least one transparent or translucent surface;

a light source within the enclosure configured to illuminate the transparent or translucent surface with primary light;

a light diffuser located between the light source and the transparent or translucent surface; and, a plurality of quantum dots adhered to the transparent or translucent surface in a preselected pattern, said quantum dots emitting secondary light in response to excitation by the primary light, wherein the sign illumination is a blend of the primary light and the secondary light.

2. An illuminated sign as recited in claim 1 wherein the preselected pattern comprises alphanumeric characters.

3. An illuminated sign as recited in claim 1 wherein the preselected pattern comprises a graphics pattern.

4. An illuminated sign as recited in claim 1 wherein the light source comprises light-emitting diodes that emit predominately in the blue portion of the visible spectrum or in the ultraviolet portion of the electromagnetic spectrum.

5. An illuminated sign as recited in claim 1 wherein the quantum dots comprise a core of II-VI, II-V, III-V, IV or IV-VI semiconductor material.

6. An illuminated sign as recited in claim 5 wherein the quantum dots comprise a core of heavy metal-free semiconductor material.

7. An illuminated sign as recited in claim 6 wherein the heavy metal-free quantum dots comprise a core comprising indium and phosphorus and optionally comprising one or more elements selected from the group consisting of zinc, sulphur, and selenium.

8. An illuminated sign as recited in claim 5 wherein the heavy metal-free quantum dot cores are shelled with one or more layers comprised of heavy metal-free II-VI and/or III-V semiconductor material and/or their ternary and quaternary alloys.

9. An illuminated sign as recited in claim 1 wherein the quantum dots are adhered to the translucent surface as a component of dried ink.

10. An illuminated sign as recited in claim 9 further comprising an oxygen barrier coating applied to the dried ink.

11. An illuminated sign as recited in claim 10 wherein the oxygen barrier coating comprises butyl rubber.

12. An illuminated sign as recited in claim 1 wherein the quantum dots are contained within polymer beads.

13. An illuminated sign as recited in claim 1 wherein the quantum dots are contained within the pores of a porous polymer.

14. An illuminated sign as recited in claim 1 comprising a solid-state light emitting diode and a quantum dot phosphor at a location remote from the light-emitting diode.

15. The illuminated sign recited in claim 1 wherein the transparent or translucent surface is a surface of the light diffuser.

* * * * *